(12) United States Patent
Davey

(10) Patent No.: US 6,859,788 B1
(45) Date of Patent: Feb. 22, 2005

(54) AUTOMATED ASSESSMENT OF PERSONAL FINANCIAL RISK TOLERANCE

(75) Inventor: Thomas Geoffrey Davey, New South Wales (AU)

(73) Assignee: Finametrica Limited, Sydney (AU)

( * ) Notice: Subject to any disclaimer, the term of this patent is extended or adjusted under 35 U.S.C. 154(b) by 0 days.

(21) Appl. No.: 09/457,885

(22) Filed: Dec. 10, 1999

Related U.S. Application Data

(60) Provisional application No. 60/111,905, filed on Dec. 10, 1998.

(51) Int. Cl.[7] .............................................. G06F 17/60
(52) U.S. Cl. .......................................... 705/38; 705/36
(58) Field of Search ..................................... 705/35–38

(56) References Cited

U.S. PATENT DOCUMENTS

| | | | | |
|---|---|---|---|---|
| 5,551,880 A | * | 9/1996 | Bonnstetter | 434/236 |
| 6,078,904 A | * | 6/2000 | Rebane | 705/36 |
| 6,119,103 A | * | 9/2000 | Basch | 705/35 |

FOREIGN PATENT DOCUMENTS

| | | | | |
|---|---|---|---|---|
| WO | WO 99/05625 | * | 2/1999 | 705/38 |

OTHER PUBLICATIONS

"How Mutual Funds Work", Risk Tolerance Questionnaire, © 1998, Fredman and Wiley.*
Grable, John, et al., "Financial risk tolerance revisted: the development of a risk assessment instrument," Financial Services Review, publication date unclear, pp. 164–181.

"Personal Financial Risk Tolerance," The American College, Bryn Mawr, Pennsylvania, 1994.

"Survey of Financial Risk Tolerance: User's Guide," The American College, Bryn Mawr, Pennsylvania, 1994.

* cited by examiner

*Primary Examiner*—Richard Chilcot
(74) *Attorney, Agent, or Firm*—Cowan, Liebowitz & Latman, P.C.

(57) ABSTRACT

A method and system for the automated assessment of personal financial risk tolerance comprises a data means for receiving responses to a series of questions, with each response being one of a number of choice represented by a numerical value falling within a predetermined range, spanning least risk tolerance to most risk tolerance. Software instructions, implemented on a computer, are used to automatically substitute a z-score for each of the numerical value responses, based on predetermined norms, and then to determine a risk tolerance score from the z-scored answers by summing the z-scored answers, and z-scoring and scaling the calculated sum. The risk tolerance score is categorized within one of a number of pre-defined risk group bands, and a report is generated to the respondent containing information particular to the relevant risk group band and the individual's characteristics in relation to that band.

18 Claims, 3 Drawing Sheets

AUTOMATED ASSESSMENT OF PERSONAL FINANCIAL RISK TOLERANCE

CROSS-REFERENCE TO RELATED APPLICATIONS

This application is a continuing application of U.S. Provisional Application Ser. No. 60/111,905, filed on Dec. 10, 1998, hereby incorporated by reference as if set forth fully herein.

BACKGROUND OF THE INVENTION

1) Field of the Invention

The field of the present invention relates to an automated system and method for the assessment of an individual's attitude towards financial risk.

2) Background

Risk is involved where a choice has to be made, and there is uncertainty about the outcome of at least one of the alternatives. Risk tolerance is the level of risk with which an individual is comfortable. As such, it is a personal attribute. In relation to an individual's attitude towards financial risk, it is desirable from many points of view to make an assessment for risk tolerance.

Studies confirm that people generally do not accurately estimate their own risk tolerance (and, not surprisingly, given the difficulties in any communication about an intangible, that their advisers' estimates are less accurate than their own). While the pattern of estimates is scattered, there is a slight overall tendency to under-estimate. A possible explanation for this is that the majority of the population is, in absolute terms, more risk-avoiding than it is risk-seeking. Faced with a choice between a certain profit and an uncertain, but probably larger profit, a sizeable majority chooses the certain (but probably smaller) profit. Someone, who in absolute terms is slightly risk-averse, may not realise that this is typical of the population as a whole.

For a measure of risk tolerance to be useful, the underlying methodology must ensure validity, reliability and accuracy. Validity requires that the methodology actually measures what it purports to measure. Reliability means that methodology is consistent for the same individual with time.

A system and method for assessing personal risk tolerance satisfying these criteria is useful to the individual so far as it will assist them in gaining self-knowledge to assist in making appropriate decisions concerning their financial position. There are also advantages for financial advisors, in that they will be able to advise clients in making financial decisions in a manner more in sympathy with their clients' attitude towards risk. For example, where an advisor would normally commend a course of action which involves a level of risk greater than the client's tolerance, both client and advisor should be aware of the conflicts so that they can work towards a compromise. Similarly, where a course of action involves a level of risk lower than the client's risk tolerance, the client and the advisor can decide on higher goals, or on diverting some resources elsewhere, or perhaps, simply to accept greater certainty of the lower risk.

The Financial Services industry is so pervasive and of such a size that it touches every adult American at one stage or another through their lifetime so far as decisions in investment, insurances, borrowing, purchasing, and so on are concerned.

A known risk tolerance instrument is described in the "Survey of Financial Risk Tolerance" (SOFRT), developed by The American College, of 270 S. Bryn Mawr Avenue, Bryn Mawr, Pa. 19010, and released in 1994. The College is a private US University established by the Insurance industry in the 1970s. The author of the survey is Michael J. Roszkowski PhD. The SOFRT was designed as an instrument for financial advisers to use with their clients. It is available as a PC-based software package. Alternatively, advisers can have clients complete a hard copy questionnaire and then forward it to the College for processing.

The above-referenced risk tolerance instrument operates by providing an individual with a questionnaire comprising 57 multiple-choice questions, where each choice is numbered (e.g. 1–5). Each answer is scored by using the number chosen. The sequence of choices is either from low risk to high risk, or high risk to low risk. In the latter case, the choice numbers are reversed during scoring.

Two overall scores are then calculated: a Risk Tolerance Score and a Consistency Score. The Risk Tolerance Score is, in effect, the sum of scores for individual questions, scaled linearly in the range 0 to 100. The risk tolerance scores have a mean of 43 and a standard deviation of 11. The Consistency Score is a "manufactured" variable used to measure the "scatter" of the person's individual answers around their Risk Tolerance Score.

A printed report is produced in which the Risk Tolerance Score is stated, along with the percentage of higher/lower. scores. The Consistency Score is used to report consistency in terms of the proportion of people who have higher or lower scores. The printed report also indicates whether the respondent has an accurate self-impression of risk tolerance. To make such a determination, the first question in the questionnaire asks respondents to rate themselves compared to others on a scale of 1 (extremely low risk taker) to 7 (extremely high risk taker). The accuracy of this self-impression is reported by way of comparing the person's risk tolerance score with the average of the scores for those who made the same choice in the first question. However, the unsophisticated nature of the report in general means that the SOFRT has limited value to individuals and their advisers. Additionally, there are generally considered to be too many questions, and the questions are of a nature that is not easily understood by respondents.

SUMMARY OF THE INVENTION

It is an object of the invention to overcome, or at least ameliorate the disadvantages with the prior art arrangement, and to provide an improved method and system for automated assessment of risk tolerance.

The invention, in one aspect, discloses a method for the automated assessment of personal financial rick tolerance, the method comprising the steps of:
 (a) receiving a response to each of a series of questions, each said response being one of a number of choices represented by a numerical value falling within a predetermined range spanning the least risk tolerance to most risk tolerance;
 (b) for each said question, substituting a z-score value for each said chosen numerical value; and
 (c) determining a risk tolerance score from said z-scored values.

The invention, in another aspect, discloses a method for the automated assessment of personal financial risk tolerance, the method comprising the steps of:
 (a) receiving a response to each of a series of questions, each said response being one of a number of choices represented by a numerical value falling within a predetermined range spanning the least risk tolerance to most risk tolerance;

(b) for each said question, substituting a z-score value for each said chosen numerical value;

(c) determining a risk tolerance score from said z-scored values;

(d) allocating said score to a respective one of a plurality of risk group bands distributed in a score range; and (e) for one or more said questions:
  (i) storing a subset of characteristic choices for members of the respective allocated risk group; and
  (ii) comparing said response for membership of said subset, and if not, indicating an exception.

A report can be output that includes the reported score and information particular to the relevant risk group. For each question, a distribution function for sample set of responses is calculated, and a z-score value defined for each value. This procedure forms norming data. Determination of a risk tolerance score can be determined by summing the z-scores for the chosen values for all questions, applying a z-score standard deviation to that sum, and scaling the resultant value to give the risk tolerance score. Additionally, the risk tolerance score can be compared with the individual's own estimate thereof, which is preferably the response to one of the questions included in the questionnaire.

In another aspect, the invention further provides a system for the automated assessment of personal financial risk tolerance. In a preferred embodiment, such a system comprises:

input means to receive a response to each of a series of questions, each said response being one of a number of choices represented by a numerical value falling within a predetermined range spanning the least risk tolerance to the most risk tolerance; and processor means operable to, for each question, substitute a z-score value for each said chosen numerical value, and to determine a risk tolerance score from the z-scored answers.

The invention further provides a computer readable memory medium storing a program for apparatus which, when programmed, performs the above method.

Other embodiments, variations and enhancements are further described herein or else depicted in the drawings.

BRIEF DESCRIPTION OF THE DRAWINGS

Preferred embodiments of the invention will be described with reference to the accompanying drawings, in which.

DESCRIPTION OF PREFERRED EMBODIMENTS

System Architecture

Figure 1:
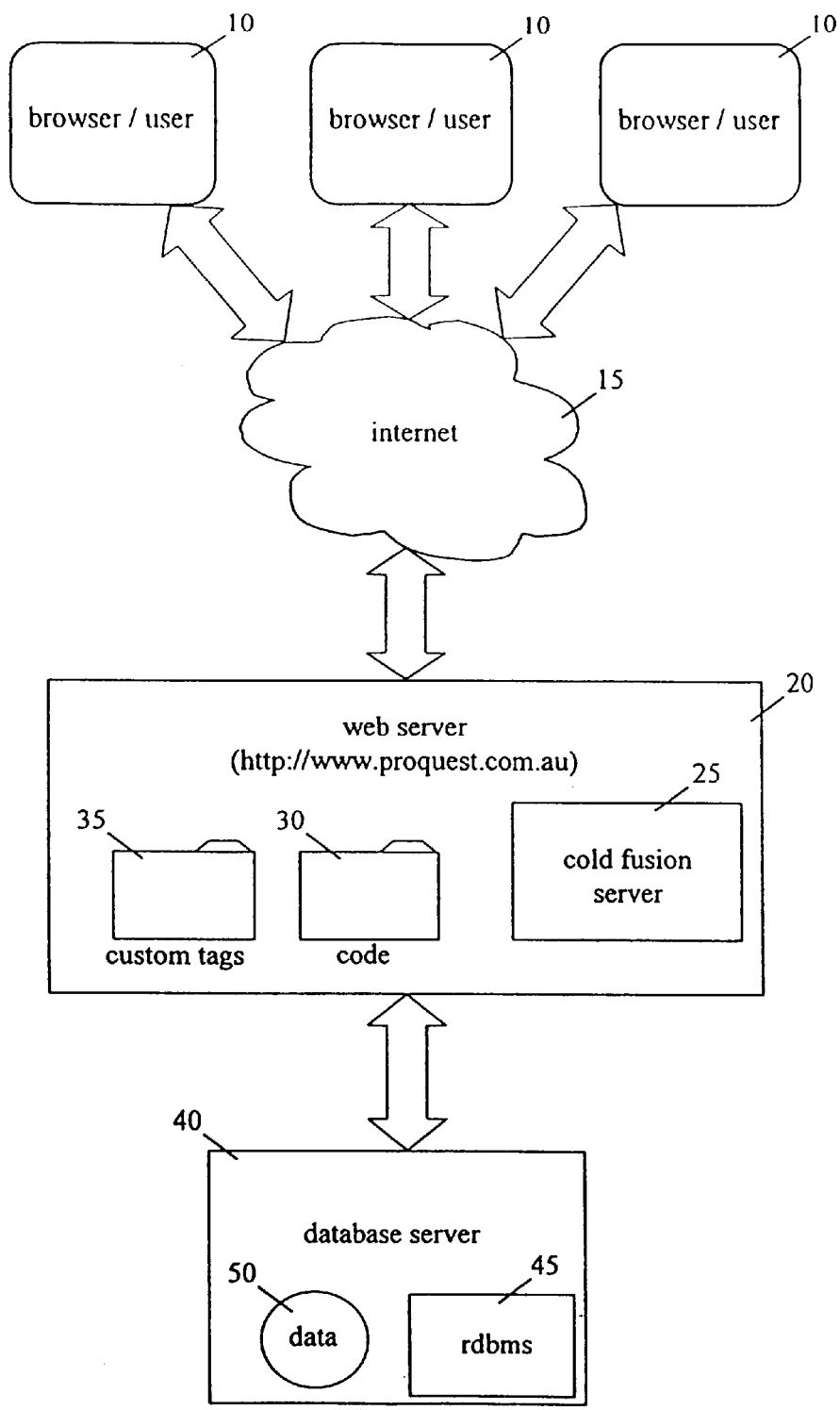
FIG. 1 is a schematic block diagram of a system architecture in accordance with one embodiment of the invention.

FIG. 1 shows a schematic block diagram representing system architecture in accordance with one embodiment of the invention, such as is suited to a remote user situation, e.g. using the Internet.

As shown in FIG. 1, a preferred system includes a web server (20) which accesses software for implementing various aspects of the risk tolerance assessment methodology as described herein. Using techniques commonly known with the Internet, many browsers/users (10) may, via the Internet infrastructure (15), make an enquiry of web server (20). The web server (20) principally comprises of an engine known as the Cold Fusion™ server (25), with which is associated a code block (30) and a related custom tag code block (35). The Cold Fusion™ server (25) is a software engine in the form of a meta language ("cfml"), being a product of Allaire Corporation, a business located at One Alewife Center, Cambridge, Mass. 02140. The server (25) treats the relevant code as screen pages with which users interact. The server (25) also interacts with a database server (40), typically located on a separate hardware platform. The database server (40) includes any convenient form of relational database management system (45) and a data storage element (50). The Cold Fusion™ server (25) contains the software elements that perform the algorithmic processing of data, as presently will be described.

Alternatively, the various risk tolerance assessment tools described herein may be implemented in software running on a local computer network or even a single computer workstation. However, the system architecture depicted in FIG. 1 makes remote access of the risk tolerance assessment tools particularly convenient.

The Questionnaire

A preferred questionnaire for assessing risk tolerance according to the methodologies described herein comprises twenty-five questions, with all except one being multiple-choice. The multiple-choice questions are numbered, and each answer is scored by using the number of the choice chosen. The sequence of choices is ordered either from low risk to high risk, or high risk to low risk. In the latter case, the choice numbers are reversed during scoring. In the last question, the respondent is asked to estimate their risk tolerance score, and the respondent's numerical estimate is used as the score for this question.

A questionnaire for presentation to respondents, reflecting a preferred embodiment of the invention, is set forth as follows:

1. Compared to others, how do you rate your willingness to take financial risks?
   1. Extremely low risk taker.
   2. Very low risk taker.
   3. Low risk taker.
   4. Average risk taker.
   5. High risk taker.
   6. Very high risk taker.
   7. Extremely high risk taker.

2. How easily do you adapt when things go wrong financially?
   1 Very uneasily.
   2 Somewhat uneasily.
   3 Somewhat easily.
   4 Very easily.

3. When you think of the word 'risk' in a financial context, which of the following words comes to mind first?
   1 Danger.
   2 Uncertainty.
   3 Opportunity.
   4 Thrill.

4. Have you ever invested a large sum in a risky investment mainly for the 'thrill' of seeing whether it went up or down in value?
   1. No.
   2. Yes, very rarely.
   3. Yes, somewhat rarely.
   4. Yes, somewhat frequently.
   5. Yes, very frequently.

5. If you had to choose between more job security with a small pay rise, and less job security with a big pay rise, which would you pick?

1. Definitely more job security with a small pay rise.
2. Probably more job security with a small pay rise.
3. Not sure.
4. Probably less job security with a big pay rise.
5. Definitely less job security with a big pay rise.

6. When faced with a major financial decision, are you more concerned about the possible losses or the possible gains?
   1. Always the possible losses.
   2. Usually the possible losses.
   3. Usually the possible gains.
   4. Always the possible gains.

7. How do you usually feel about your major financial decisions after you make them?
   1. Very pessimistic.
   2. Somewhat pessimistic.
   3. Somewhat optimistic.
   4. Very optimistic.

8. Imagine you were in a job where you could choose whether to be paid salary, commission or a mix of both. Which would you pick?
   1. All salary.
   2. Mainly salary.
   3. Equal mix of salary and commission.
   4. Mainly commission.
   5. All commission.

9. What degree of risk have you taken with your financial decisions in the past?
   1. Very small.
   2. Small.
   3. Medium.
   4. Large.
   5. Very large.

10. What degree of risk are you currently prepared to take with your financial decisions?
    1. Very small.
    2. Small.
    3. Medium.
    4. Large.
    5. Very large.

11. Have you ever borrowed money to make an investment (other than for your home)?
    1. No.
    2. Yes.

12. How much confidence do you have in your ability to make good financial decisions?
    1. None.
    2. A little.
    3. A reasonable amount.
    4. A great deal.
    5. Complete.

13. Suppose that 5 years ago you bought shares in a highly regarded company. That same year the company experienced a sever decline in sales due to poor management. The price of the shares dropped drastically and sold at a substantial loss.
    The company has been restructured under new management, and most experts now expect its shares to produce better than average returns. Given your bad past experience with this company, would you buy shares now?
    1. Definitely not.
    2. Probably not.
    3. Not sure.
    4. Probably.
    5. Definitely.

14. Investments can go up or down in value, and experts often say you should be prepared to weather a downturn. By how much could the total value of all your investments go down before you would begin to feel uncomfortable?
    1. Any fall would make me feel uncomfortable.
    2. 10%.
    3. 20%
    4. 33%
    5. 50%
    6. More than 50%.

15. Assume that a long-lost relative dies and leaves you a house which is in a poor condition but located in a suburb that's becoming popular. As is, the house would probably sell for $150,000, but if you were to spend about $50,000 on renovations, the selling price would be around $300,000. However, there is some talk of constructing a major highway next to the house, and this would lower its value considerably.
    Which of the following options would you take?
    1. Sell it as is.
    2. Keep it as is, but rent it out.
    3. Take out a $50,000 mortgage and do the renovations.

16. Most investment portfolios have a spread of investments—some of the investments may have high expected returns but with high risk, some may have medium expected returns and medium risk, and some may be low-risk/low-return. (For example, shares and property would be high risk/high return whereas cash and term deposits would be low-risk/low-return.)
    Which spread of investments do you find most appealing? Would you prefer all low-risk/low-return, all high-risk/high-return, or somewhere in between?

| | Spread of Investments in Portfolio | | |
|---|---|---|---|
| Portfolio | High Risk/Return | Medium Risk/Return | Low Risk/Return |
| 1 | 0% | 0% | 100% |
| 2 | 0% | 30% | 70% |
| 3 | 10% | 40% | 50% |
| 4 | 30% | 40% | 30% |
| 5 | 50% | 40% | 10% |
| 6 | 70% | 30% | 0% |
| 7 | 100% | 0% | 0% |

17. You are considering placing one-quarter of your investment funds into a single investment. This investment is expected to earn about twice the term deposit rate. However, unlike a term deposit, this investment is not protected against loss of the money invested.
    How low would the chance of a loss have to be for you to make the investment?
    1. Zero, i.e., no chance of any loss.
    2. Very low chance of loss.
    3. Moderately low chance of loss.
    4. 50% chance of loss.

18. With some types of investment, such as cash and term deposits, the money value of the investment is fixed. However inflation will cause the purchasing power of this money value to decrease.
    With other types of investment, such as shares and property, the money value is not fixed. It will vary. In the short term it may even fall below the purchase price. However over the long term, the money value of the shares and property should certainly increase by more than the rate of inflation.

With this in mind, which is more important to you—that the money value of your investments does not fall or that it retains its purchasing power?
1. Much more important that the money value does not fall.
2. Somewhat more important that the money value does not fall.
3. Somewhat more important that the money value retains its purchasing power.
4. Much more important that the money value retains its purchasing power.

19. In recent years, how have your personal investments changed?
1. Always toward lower risk.
2. Mostly toward lower risk.
3. No changes or changes with no clear direction.
4. Mostly toward higher risk.
5. Always toward higher risk.

20. When making an investment, return and risk usually go hand-in-hand. Investments which produce above average returns are usually of above-average risk. With this in mind, how much of the funds you have available to invest would you be willing to place in investments where both returns and risks are expected to be above average?
1. None.
2. 10%.
3. 20%.
4. 30%.
5. 40%.
6. 50%.
7. 60%.
8. 70%.
9. 80%.
10. 90%.
11. 100%.

21. Think of the average rate of return you would expect to earn on an investment portfolio over the next ten years. How does this compare with what you think you would earn if you invested the money in term deposits?
1 About the same rate as from term deposits.
2 About one and a half times the rate from term deposits.
3 About twice the rate from term deposits.
4 About two and a half times the rate from term deposits.
5 About three times the rate from term deposits.
6 More than three times the rate from term deposits.

22. People often arrange their financial affairs to qualify for a government benefit or obtain a tax advantage. However a change in legislation can leave them worse off than if they'd done nothing.
With this in mind, would you take a risk in arranging your affairs to qualify for a government benefit or obtain a tax advantage?
1 I would not take a risk if there was any chance I could finish up worse off.
2 I would take a risk if there was only a small chance I could finish up worse off.
3 I would take a risk as long as there was more than a 50% chance that I would finish up better off.

23. Imagine that you are borrowing a large sum of money at some time in the future. It's not clear which way interest rates are going to move—they might go up, they might go down, no one seems to know.
You could take a variable interest rate that will rise and fall as the market rate changes. Or you could take a fixed interest rate which is 1% more than the current variable rate but which won't change as the market rate changes. Or you could take a mix of both.
How would you prefer your loan to be made up?
1 100% variable.
2 75% variable, 25% fixed.
3 50% variable, 50% fixed.
4 25% variable, 75% fixed.
5 100% fixed.

24. Insurance can cover a wide variety of life's major risks—theft, fire, accident, illness, death etc. How much cover do you have?
1 Very little.
2 Some.
3 Considerable.
4 Complete.

Figure 3:
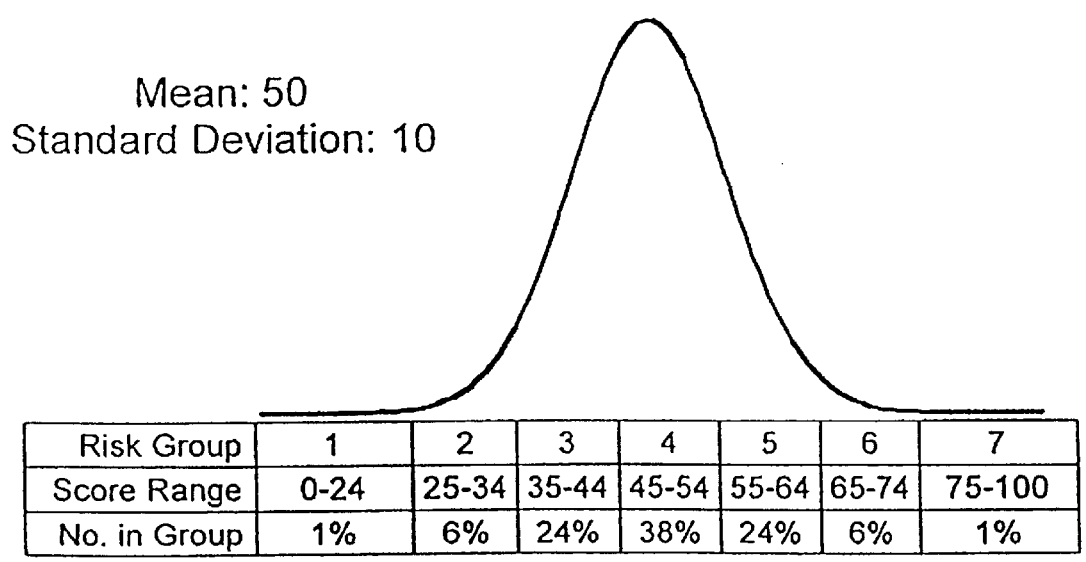
FIG. 3 is representation of the segmented range of results.

25. This questionnaire is scored on a scale of 0 to 100. When the scores are graphed they follow the familiar normal distribution (ie. FIG. 3). The average score is 50. Two-thirds of all scores are within 10 points of the average. Only 1 in 1000 is less than 20 or more than 80. What do you think your score will be?

Gathering of Norms

According to one or more embodiments as described herein, as part of developing and implementing an automated system for personal financial risk tolerance, a set of "norms" is initially derived based on an evaluation and analysis of answers to completed questionnaires (such as the preferred one set forth above) from a statistically meaningful group of respondents. Using the answers from the initial "test group" of respondents, a z-score value is determined for each possible answer to each of the questions in the questionnaire, and the z-score values are stored (in a look-up table or other convenient data structure) for later use by the automated system. An overall standard deviation for the entire group is also calculated and stored for later use by the automated system. The z-score values and the overall standard deviation are used in various embodiments to obtain a categorization of a respondent to the questionnaire within one of several predetermined risk groups, according to techniques described below.

According to an embodiment as disclosed herein, completed questionnaires taken from a statistically significant sample group of respondents form the data for developing a set of "norms" that determine the parameters to be used in the risk tolerance scoring algorithm.

These norms are preferably calculated, on a question-by-question basis, according to the following steps:

a) The mean and standard deviation of each question's scores is calculated.

b) The calculated mean and standard deviation are used, question-by-question, to calculate z-score mappings for each of the choices.

For example, for Question 1 in the questionnaire, a sample set of respondents resulted in a normal distribution function having a mean value of 3.5461, with a standard deviation of 0.8902. The z-score value expresses the number of standard deviations that each answer of "1" to "7" is away from the population mean of 3.5461. In this case the results, as set forth in Table 1 below, are:

TABLE 1

| Answer | Z-score value |
|---|---|
| 1 | −2.8601 |
| 2 | −1.7368 |
| 3 | −0.6135 |
| 4 | +0.5099 |
| 5 | +1.6332 |
| 6 | +2.7566 |
| 7 | +3.8799 |

The same process is used for Questions 2 through 25 to obtain z-score values for each possible answer to each question, based upon the normal distribution function for the responses to each question.

c) Questionnaire-by-questionnaire, each answer is re-scored using the z-score mappings (as derived above) in substitution, and a "raw" score equal to the sum of the z-score mappings is calculated.

d) The overall standard deviation of these "raw" scores is calculated. Because the component variables are z-scores, the mean of the "raw" score must be 0.

The set of norms thus derived is embodied as (i) a set of Answer-to-z-score mappings for each question, and (ii) an overall standard deviation across the whole sample population. Once the "norms" are gathered in a statistically meaningful sample, they can be used to assess a respondent's risk tolerance score.

Scoring

Figure 2:
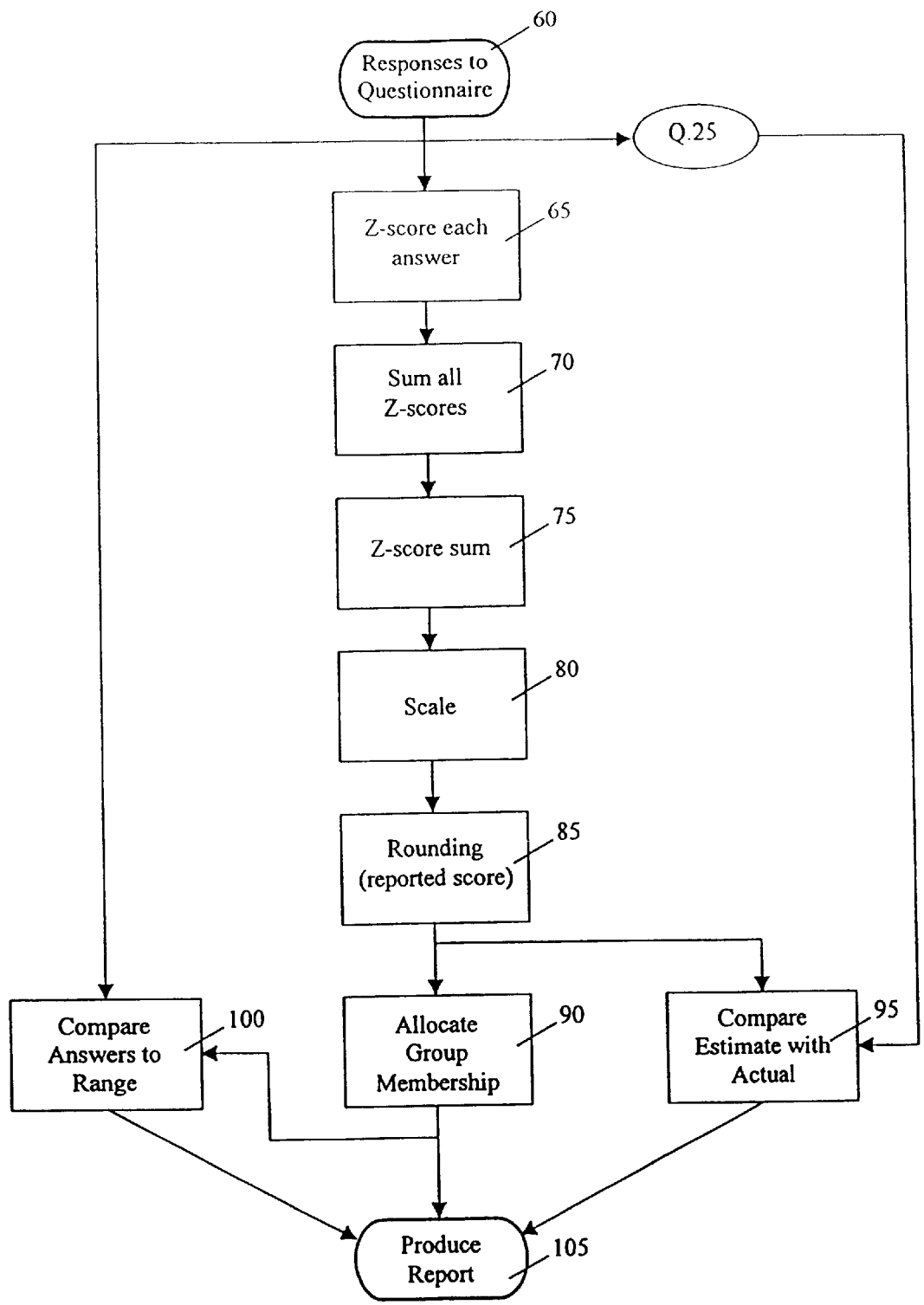
FIG. 2 is a flow diagram illustrating a preferred scoring and scaling methodology.

A preferred methodology for accomplishing scoring of a respondent's questionnaire is illustrated in flow diagram form in FIG. 2, and includes the following steps:

a) Each question's answer is mapped to a corresponding z-score using the respective norm, previously derived according to the procedure described above (block 65).

b) The z-scores for all of the answers to the questionnaire are summed to a "raw" score (block 70).

c) The "raw" score is z-scored (block 75).

d) The z-scored "raw" score is scaled to a mean of 50, and a standard deviation of 10, resulting in what may be referred to for convenience as a 50/10 scaled score (block 80).

e) The 50/10 scaled score is rounded down to the nearest integer (block 85).

Worked Example

The following table (Table 2) gives an example of the calculations for a respondent using the above scoring methodology. The norms for Question 1 are as given in Table 1 above, while the norms for Questions 2 through 25 are obtained in a manner similar to that described for Question 1 above. The overall standard deviation obtained from the norm data used in this example is 10.726541.

TABLE 2

|  | Question 1 | Question 2 | Question 3 | Question 4 | Question 5 |
|---|---|---|---|---|---|
| Answers | 5 | 2 | 2 | 1 | 3 |
| Z-scored answers | 1.633 | −0.314 | −0.146 | −0.499 | 0.065 |

|  | Question 6 | Question 7 | Question 8 | Question 9 | Question 10 |
|---|---|---|---|---|---|
| Answers | 3 | 3 | 3 | 3 | 3 |
| Z-scored answers | 0.420 | −0.078 | 1.025 | 0.689 | −0.689 |

TABLE 2-continued

|  | Question 11 | Question 12 | Question 13 | Question 14 | Question 15 |
|---|---|---|---|---|---|
| Answers | 1 | 3 | 4 | 3 | 2 |
| Z-scored answers | 0.865 | −0.071 | −1.138 | 0.113 | 0.410 |

|  | Question 16 | Question 17 | Question 18 | Question 19 | Question 20 |
|---|---|---|---|---|---|
| Answers | 5 | 2 | 3 | 3 | 6 |
| Z-scored answers | −0.968 | −0.438 | 0.650 | 0.134 | 0.713 |

|  | Question 21 | Question 22 | Question 23 | Question 24 | Question 25 |
|---|---|---|---|---|---|
| Answers | 3 | 2 | 2 | 3 | 60 |
| Z-scored answers | −.226 | 0.010 | −0.733 | −0.040 | 1.359 |

| | |
|---|---|
| Sum of Z-scores | 8.211 |
| Z-scored Sum (Sum/10.726541) | 0.76547 |
| Scaled Sum (Z-scored Sum * 10 + 50) | 57.6547 |
| Reported Score (Scaled Sum Rounded Down) | 57 |

As illustrated in Table 2, each answer for Questions 1 through 25 is mapped to a corresponding z-score. In the above example, the sum of all z-scores for Questions 1 through 25 for the particular respondent is 8.211. The z-scored sum is calculated as the sun of all z-scores divided by the overall standard deviation obtained from the norm data (in this example, 10.726541), resulting in a z-scored sum in this example of 0.76547. The scaled score or sum is derived by multiplying the z-scored sum by ten and adding 50 (i.e., by scaling the z-scored sum to a mean of 50 and a standard deviation of 10), resulting in this example in a scaled score or sum of 57.6547. The reported score is the scaled score rounded down to the nearest integer—in this example, 57.

In step 90 of the flow diagram depicted in FIG. 2, the respondent's score is allocated to or categorized in one of a number of predetermined Risk Groups. The division of scores into various Risk Group categories or bands may be accomplished in many different ways, based upon the objectives of the risk assessor and the desired granularity of the personal risk assessment. According to a preferred methodology, the possible risk scores (from 1 to 100) are divided into seven Risk Groups, as illustrated in FIG. 3, although other numbers of Risk Groups may be selected. A choice of seven Risk Groups has been selected as having enough categories so as to result in meaningful risk assessment to the respondent, while having few enough categories so that financial advisors or other evaluators will be able to relatively easily memorize the general characteristics of each Risk Group. In the particular example illustrated in FIG. 3, the middle of the seven Risk Groups (i.e., Risk Group 4) was selected so as to straddle the mid-point (i.e., a score of 50) and spread across a width equal to a standard deviation (i.e., 10 points), with each of Risk Groups 2, 3, 5 and 6 being separated by a standard deviation and being of the same width as Risk Group 4. Both of the outer extreme Risk Groups (i.e., Risk Groups 1 and 7) span a width equal to 25 points. In the particular example illustrated in FIG. 3, the percentage of respondents falling in each of Risk Groups 1 through 7 are 1%, 6%, 24%, 38%, 24%, 6% and 1%, respectively. While an effort could be made to make the populations of each Risk Group equal, the result might be to group individuals having widely disparate risk behavior in the same group—for example, a respondent having a score of 1 would be placed in the same category as an individual having a score in the mid-thirties or possibly more, even though their risk behavior would generally be very different. Therefore, a preferred division of scores into risk group bands preferably maintains, to the extent possible, individuals with similar risk behavior in the same group.

Accordingly, in a preferred embodiment, the respondent's score in step 90 would be categorized in one of the seven possible Risk Groups shown in FIG. 3. That is, the respondent would be categorized in Risk Group 1 if the respondent's score were between 0 and 24, in Risk Group 2 if the score were between 25 and 34, and so on. In the above example relating to Table 2, wherein the respondent's rounded-down scaled score was 57, the respondent would be categorized in Risk Group 5 (i.e., scores between 55 and 64).

FIG. 2 also shows the further steps of comparing the respondent's estimate (Question 25), in step 90, with the actual (rounded) score obtained from step 85. Additionally, in step 100, each individual's actual answer (e.g. whichever 1–7 for Question 1) for selected questions may be compared against an expected range for the risk group in question (determined by step 90). The reporting for the respondent, in step 105, preferably utilizes the three sources as indicated in FIG. 2.

Reporting

The results of the automated assessment of a respondent's risk tolerance are preferably described to the respondent in a report. By way of example, the form of reporting can be as a screen display, data file or in printed form.

As noted above, the Reported Score will fall within one of a number of "Risk Groups" (or bands) on the normal distribution curve. The number of Risk Groups may be seven, as represented in FIG. 3, or any other convenient number. In reporting the particular individual's financial risk tolerance, the rounded reported score can be presented, along with an appropriate commentary, such as the following:

Your risk tolerance score enables you to compare yourself to a representative sample of the adult population. Your score is 57. This is a higher-than-average score, higher than 71% of all scores.

A comment also can be made comparing the estimated score (from step 95) with the Reported Score. For example:

In answer to the last question, you estimated your score would be 60. Congratulations! You were close. Most people under-estimate their score by a few points.

Also accompanying the individual score and commentary, a generalized description specific to each individual risk group (i.e. Risk Groups 1–7) is preferably presented as part of the report. The following text represents examples of the report for each Risk Group; in the present example illustrated by the response data set forth in Table 2, the particular respondent falls in Risk Group No. 5.

Risk Group No. 1

Making Financial Decisions

They usually think of "risk" as "danger" and have, at most, little confidence in their ability to make good financial decisions. They usually feel at least somewhat pessimistic about their major financial decisions after they make them.

They are prepared to take, at most, a small degree of risk with their financial decisions and are always more concerned about the possible losses than the possible gains.

Financial Disappointments

Typically, when things go wrong financially they adapt very uneasily.

Financial Past

They have taken no more than a small degree of risk with their past financial decisions and have never borrowed money to make an investment.

Investment

Most feel that it is much more important that the money value of their investments does not fall than that it retains its purchasing power. Over ten years, most expect an investment portfolio to earn, on average, not more than about one and a half times the rate from term deposits. Any fall in the total value of their investments would make them feel uncomfortable.

Given these portfolio choices,

| | Expected Return and Risk | | |
|---|---|---|---|
| | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% | where shares and property are high return/high risk and cash and term deposits are low return/low risk, their most common choices are Portfolios 1 and 2.

Borrowing

If they were borrowing a large sum of money at a time when it was not clear which way interest rates were going to move and when the fixed interest rate was 1% more than the then variable rate, they would choose to have not less than 75% of the loan at fixed interest.

Government Benefits and Tax Advantages

If there was any chance they could finish up worse off than if they'd done nothing, they would not take a risk in arranging their affairs to qualify for a government benefit or obtain a tax advantage.

Risk Group No. 2

Making Financial Decisions

They usually think of "risk" as "danger" or "uncertainty" and have, at most, little confidence in their ability to make good financial decisions. They usually feel at least somewhat pessimistic about their major financial decisions after they make them.

They are prepared to take, at most, a small degree of risk with their financial decisions and are usually, if not always, more concerned about the possible losses than the possible gains.

Financial Disappointments

Typically, when things go wrong financially they adapt somewhat or very uneasily.

Financial Past

They have taken no more than a small degree of risk with their past financial decisions and have never borrowed money to make an investment.

Investment

Most feel that it is at least somewhat more important that the money value of their investments does not fall than that it retains its purchasing power. Over ten years, most expect an investment portfolio to earn, on average, not more than about one and a half times the rate from term deposits. Any fall in the total value of their investments would make them feel uncomfortable.

Given these portfolio choices,

|  | Expected Return and Risk | | |
|---|---|---|---|
|  | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% | where shares and property are high return/high risk and cash and term deposits are low return/low risk, their most common choice is Portfolio 2.

Borrowing

If they were borrowing a large sum of money at a time when it was not clear which way interest rates were going to move and when the fixed interest rate was 1% more than the then variable rate, they would choose to have not less than 75% of the loan at fixed interest.

Government Benefits and Tax Advantages

If there was any chance they could finish up worse off than if they'd done nothing, they would not take a risk in arranging their affairs to qualify for a government benefit or obtain a tax advantage.

Risk Group No. 3

Making Financial Decisions

They usually think of "risk" as "uncertainty". They have a reasonable amount of confidence in their ability to make good financial decisions and usually feel somewhat optimistic about their major financial decisions after they make them.

They are prepared to take a small to medium degree of risk with their financial decisions and are usually more concerned about the possible losses than the possible gains.

Financial Disappointments

Typically, when things go wrong financially they adapt somewhat or very uneasily.

Financial Past

They have taken a small to medium degree of risk with their past financial decisions. Two-thirds of this group have never borrowed money to make an investment.

Investment

With regard to the money value of their investments, they feel that retaining its purchasing power is of comparable importance to its not falling. Over ten years, most expect an investment portfolio to earn, on average, from one and a half to twice the rate from term deposits. Typically, they would begin to feel uncomfortable if the total value of their investments went down by 10%.

Given these portfolio choices,

|  | Expected Return and Risk | | |
|---|---|---|---|
|  | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% |

Where shares and property are high return/high risk and cash and term deposits are low return/low risk, their most common choice is Portfolio 3.

Borrowing

If they were borrowing a large sum of money at a time when it was not clear which way interest rates were going to move and when the fixed interest rate was 1% more than the then variable rate, most would choose to have a 50/50 mix of fixed and variable interest.

Government Benefits and Tax Advantages

So long as there was only a small chance they could finish up worse off than if they'd done nothing, they would take a risk in arranging their affairs to qualify for a government benefit or obtain a tax advantage.

Risk Group No. 4

Making Financial Decisions

They usually think of "risk" as "uncertainty". They have a reasonable amount of confidence in their ability to make good financial decisions and usually feel at least somewhat optimistic about their major financial decisions after they make them.

They are prepared to take a medium degree of risk with their financial decisions and are usually, if not always, more concerned about the possible gains than the possible losses.

Financial Disappointments

Typically, when things go wrong financially they adapt at least somewhat easily.

Financial Past

They have taken a small to medium degree of risk with their past financial decisions. Most have never borrowed money to make an investment. One in five has invested a large sum in a risky investment mainly for the "thrill" of seeing whether it went up or down in value, but then only rarely or somewhat rarely.

Investment

Most commonly they feel it is somewhat more important that the money value of their investments retains its purchasing power than that it does not fall. Over ten years, most expect an investment portfolio to earn, on average, from one and a half to twice the rate from term deposits. Typically, they would begin to feel uncomfortable if the total value of their investments went down by 20%.

Given these portfolio choices,

|  | Expected Return and Risk | | |
|---|---|---|---|
|  | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% | where shares and property are high return/high risk and cash and term deposits are low return/low risk, their most common choice is Portfolio 4.

Borrowing

If they were borrowing a large sum of money at a time when it was not clear which way interest rates were going to move and when the fixed interest rate was 1% more than the then variable rate, they would choose to have 50% to 75% of the loan at variable interest.

Government Benefits and Tax Advantages

So long as there was only a small chance they could finish up worse off than if they'd done nothing, they would take a risk in arranging their affairs to qualify for a government benefit or obtain a tax advantage.

Risk Group No. 5

Making Financial Decisions

Most think of "risk" as "opportunity" and have a reasonable amount, if not a great deal, of confidence in their ability to make good financial decisions. They usually feel at least somewhat optimistic about their major financial decisions after they make them.

They are prepared to take a medium degree of risk with their financial decisions and are usually, if not always, more concerned about the possible gains than the possible losses.

Financial Disappointments

Typically, when things go wrong financially they adapt at least somewhat easily.

Financial Past

They have taken a medium degree of risk with their past financial decisions. About half have borrowed money to make an investment. About half have also invested a large sum in a risky investment mainly for the 'thrill' of seeing whether it went up or down in value, but then only rarely or somewhat rarely.

Investment

Most feel that it is at least somewhat more important that the money value of their investments retains its purchasing power than that it does not fall. Over ten years, most expect an investment portfolio to earn, on average, from two to two and a half times the rate from term deposits. Typically, they would begin to feel uncomfortable if the total value of their investments went down by 20%.

Given these portfolio choices,

|  | Expected Return and Risk | | |
|---|---|---|---|
|  | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% | where shares and property are high return/high risk and cash and term deposits are low return/low risk, their most common choice is Portfolio 5.

Borrowing

If they were borrowing a large sum of money at a time when it was not clear which way interest rates were going to move and when the fixed interest rate was 1% more than the then variable rate, they would choose to have at least 50% of the loan at variable interest.

Government Benefits and Tax Advantages

So long as there was only a small chance they could finish up worse off than if they'd done nothing, they would take a risk in arranging their affairs to qualify for a government benefit or obtain a tax advantage.

Risk Group No. 6

Making Financial Decisions

Most commonly they think of "risk" as "opportunity". They have a great deal of confidence, if not complete confidence, in their ability to make good financial decisions and usually feel very, or at least somewhat, optimistic about their major financial decisions after they make them.

They are prepared to take a large degree of risk with their financial decisions and are usually, if not always, more concerned about the possible gains than the possible losses.

Financial Disappointments

Typically, when things go wrong financially they adapt somewhat, if not very, easily.

Financial Past

Most have taken a large degree of risk with their past financial decisions. The great majority of this group have borrowed money to make an investment. Two-thirds have invested a large sum in a risky investment mainly for the 'thrill' of seeing whether it went up or down in value, but usually only rarely or somewhat rarely.

Investment

They feel it is much more important that the money value of their investments retains its purchasing power than that it does not fall. Over ten years, they expect an investment portfolio to earn, on average, at least three times the rate from term deposits. Typically, they would begin to feel uncomfortable if the total value of their investments went down by 33%.

Given these portfolio choices,

|  | Expected Return and Risk | | |
| --- | --- | --- | --- |
|  | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% | where shares and property are high return/high risk and cash and term deposits are low return/low risk, their most common choice is Portfolio 6.

Borrowing

If they were borrowing a large sum of money at a time when it was not clear which way interest rates were going to move and when the fixed interest rate was 1% more than the then variable rate, they would choose to have at least 50% of the loan at variable interest.

Government Benefits and Tax Advantages

So long as there was more than a 50% chance they would finish up better off than if they'd done nothing, they would take a risk in arranging their affairs to qualify for a government benefit or obtain a tax advantage.

Risk Group No. 7

Making Financial Decisions

Most commonly they think of "risk" as "opportunity" or "thrill". They have complete confidence, or at least a great deal of confidence, in their ability to make good financial decisions and usually feel very optimistic about their major financial decisions after they make them.

Most are prepared to take a very large degree of risk with their financial decisions and are always more concerned about the possible gains than the possible losses.

Disappointments

Typically, when things go wrong financially they adapt very easily.

Financial Past

They have taken a large to very large degree of risk with their past financial decisions. The great majority of this group have borrowed money to make an investment. Four out of five have at least once invested a large sum in a risky investment mainly for the "thrill" of seeing whether it went up or down in value, some have done so very frequently.

Investment

Most feel that it is much more important that the money value of their investments retains its purchasing power than that it does not fall. Over ten years, most expect an investment portfolio to earn, on average, more than three times the rate from term deposits. Typically, they would begin to feel uncomfortable if the total value of their investments went down by 50% or more.

Given these portfolio choices,

|  | Expected Return and Risk | | |
| --- | --- | --- | --- |
|  | High | Medium | Low |
| Portfolio 1 | 0% | 0% | 100% |
| Portfolio 2 | 0% | 30% | 70% |
| Portfolio 3 | 10% | 40% | 50% |
| Portfolio 4 | 30% | 40% | 30% |
| Portfolio 5 | 50% | 40% | 10% |
| Portfolio 6 | 70% | 30% | 0% |
| Portfolio 7 | 100% | 0% | 0% |

Where shares and property are high return/high risk and cash and term deposits are low return/low risk, their most common choice is Portfolio 7.

Borrowing

If they were borrowing a large sum of money at a time when it was not clear which way interest rates were going to move and when the fixed interest rate was 1% more than the then variable rate, they would choose to have at least 75% of the loan at variable interest.

Government Benefits and Tax Advantages

So long as there was more than a 50% chance they would finish up better off than if they'd done nothing, they would take a risk in arranging their affairs to qualify for a government benefit or obtain a tax advantage.

Referring to step 100 of FIG. 3, further reporting can be provided to the respondent based on differences in individual answers from those expected of members of the same Risk Group. For each Risk Group, lower and upper ranges for certain of the Questions are recorded from the sample population. For Risk Group 5, in which the Respondent fell, for some number of the questions the upper and lower answers are recorded amongst the norm data. The respondent's actual answer may be compared against the upper and lower values to identify any outlying exceptions, in a report form such as follows:

TABLE 3

| Question No. | Respondent's Answer | Group 5 Lower | Group 5 Upper | Respondent's Difference |
| --- | --- | --- | --- | --- |
| 1 | 5 |  |  |  |
| 2 | 2 | 3 | 4 | Below |
| 3 | 2 | 3 | 3 | Below |
| 4 | 1 | 2 | 3 | Below |
| 5 | 3 |  |  |  |
| 6 | 3 | 3 | 4 |  |
| 7 | 3 | 3 | 4 |  |
| 8 | 3 |  |  |  |
| 9 | 3 | 3 | 3 |  |
| 10 | 3 | 3 | 3 |  |
| 11 | 1 | 2 | 2 | Below |
| 12 | 3 | 3 | 4 |  |
| 13 | 4 |  |  |  |
| 14 | 3 | 3 | 3 |  |
| 15 | 2 |  |  |  |
| 16 | 5 | 5 | 5 |  |
| 17 | 2 |  |  |  |
| 18 | 3 | 3 | 4 |  |
| 19 | 3 |  |  |  |
| 20 | 6 |  |  |  |
| 21 | 3 | 3 | 4 |  |
| 22 | 2 | 2 | 2 |  |
| 23 | 2 | 1 | 3 |  |
| 24 | 3 |  |  |  |
| 25 | 60 |  |  |  |

For any exceptions (four in this case), a special reporting aspect (text) is triggered. The narratives are based on empirical experience of the host. Referring then to the relevant headings in the risk Group 5 report above, under Making Financial Decisions, the added report is: You think of "risk" as "uncertainty". Under Financial Disappointments, the added report is: When things go wrong financially you usually adapt somewhat uneasily. Under Financial Past, the added report is: You have never made a "thrill" investment. Under Borrowing, the added report is: You have never borrowed to make an investment.

This aspect of the reporting is significant, in that it readily highlights an individual's specific needs or aversions from amongst the normed members of the same Risk Group, thus providing an extra level of granularity that is of great commercial use to respondent and adviser alike.

Implementation of the methodology described above in computer code would be readily carried out by a person skilled in the art as a matter of routine design.

As constructed in accordance with its preferred embodiments, advantages of the present invention over the prior art discussed above are that the questionnaire is easier to answer, and that the report is more meaningful and useful. The questionnaire is easier to answer because the scoring algorithm permits the number of questions to be greatly reduced over the prior art, without compromising accuracy. Additionally, the questions themselves are easier to answer. There are far fewer questions involving unlikely hypothetical situations and no need for questions requiring mental arithmetic on probabilities. The time typically taken to do the questionnaire has been reduced over the prior art by roughly one-half (i.e., from 25–30 minutes to 10–15 minutes, on average).

The particular use of z-scoring of individual questions results in greater accuracy, notwithstanding the reduced number of questions. Reliability too is achieved, as the effect of weighting between questions (i.e. questions having two alternatives outweigh questions having five alternatives) is removed.

In addition, the report is far more meaningful and useful for individuals and their advisers because of the scoring scale and the specific text customization that pertains to the group to which the individual belongs. Further, for an individual's responses it is possible to identify differences beyond the expected range of answers by members of the same risk group, which can give a deeper insight into a respondent's risk attitude. This can demonstrate contemporaneous changes in attitude, for example.

The scale, by incorporating a normal distribution, provides a graphic representation of the distribution of risk tolerance. People are typically more comfortable with a scale which has a mean of 50 and a standard deviation of 10. The segmentation of the scale allows people to think of risk tolerance in terms of a manageable number of discrete groups for which generalized descriptions can be developed.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A method for the automated assessment of personal financial risk tolerance, the method comprising the steps of:
   (a) receiving a response to each of a series of textual questions, each said response being one of a number of choices represented by a numerical value falling within a predetermined range spanning the least risk tolerance to the most risk tolerance;
   (b) calculating a risk tolerance score from said received values;
   (c) allocating said score to a respective one of a plurality of statistically distributed risk group bands spanning a score range; and
   (d) outputting a report including said score and information particular to the relevant risk group band, said information being based upon a predetermined set of characteristic choices for members of the respective allocated risk group band for one or more questions, and including exception text based on the question text if said response differs from the respective characteristic choice.

2. The method of claim 1, wherein said risk group bands are statistically distributed based upon standard deviations from a mean value of said score range.

3. The method of claim 2, wherein there are seven said risk group bands centered on said mean value, and said mean value is 50 with a standard deviation of 10.

4. The method of claim 1, comprising the further step, occurring before step (a), for each said question, of:
   calculating a distribution function for a sample set of responses; and
   defining a z-score value for each possible choice.

5. A method as claimed in claim 4, wherein said value is substituted for the z-score value.

6. The method of claim 5, wherein step (c) includes the steps of:
   (i) summing the z-score values of said chosen values for all questions to a sum;
   (ii) applying a z-score standard deviation to said sum to obtain a resultant value; and
   (iii) scaling the resultant value to give said risk tolerance score.

7. A computer system for the automated assessment of personal financial risk tolerance, comprising:
   a memory storing: (i) a series of textual questions each having a number of answers that can be chosen by a user, the answers to each question being represented by a numerical value falling within a predetermined range spanning the least risk tolerance to the most risk tolerance; and (ii) a predetermined set of answers to one or more of said questions gathered from respondents and arranged into respective allocated risk groups;
   input means to receive a response from a user to said series of questions;
   a processor adapted to calculate a risk tolerance score from said values, and to allocate said score to a respective one of said risk group bands distributed over a score range; and
   output means outputting a report including said calculated score and information particular to the relevant risk group band, said information being based upon said set of respondent answers, and including exception text based on said respective question text if said response differs from the respective characteristic choice.

8. The computer system of claim 7, wherein said risk group bands are statistically distributed based upon standard deviations from a mean value of said score range.

9. The computer system of claim 8, wherein there are seven said risk group bands centered on said mean value, and said mean value is 50 with a standard deviation of 10.

10. The computer system of claim 7, wherein said processor initially calculates a distribution function for a sample set of responses, and defines a z-score value for each possible choice.

11. The computer system as claimed in claim 10, wherein said processor substitutes the z-score value for said value.

12. The computer system of claim 11, wherein said processor sums said z-score values of said chosen values for all questions to a sum, applies a z-score standard deviation to said sum to obtain a resultant value, and scales the resultant value to give said risk tolerance score.

13. A computer program product comprising:
- code means for receiving a response to each of a series of textual questions, each said response being one of a number of choices represented by a numerical value falling within a predetermined range spanning the least risk tolerance to the most risk tolerance;
- code means for calculating a risk tolerance score from said received values;
- code means for allocating said score to a respective one of a plurality of statistically distributed risk group bands spanning a score range; and
- code means for outputting a report including said score and information particular to the relevant risk group band, said information being based upon a predetermined set of characteristic choices for members of the respective allocated risk group band for one or more questions, and including exception text based on the question text if said response differs from the respective characteristic choice.

14. The computer program product of claim 13, wherein said risk group bands are statistically distributed based upon standard deviations from a mean value of said score range.

15. The computer program product of claim 14, wherein there are seven said risk group bands centered on said mean value, and said mean value is 50 with a standard deviation of 10.

16. The computer program product of claim 13, further comprising code means to initially calculate a distribution function for a sample set of responses, and define a z-score value for each possible choice.

17. The computer program product of claim 16, wherein said code means for calculating substitutes the z-score value for said value.

18. The computer program product of claim 17, wherein said code means for calculating sums said z-score values of said chosen values for all questions to a sum, applies a z-score standard deviation to said sum to obtain a resultant value, and scales the resultant value to give said risk tolerance score.

* * * * *